United States Patent
Song et al.

(10) Patent No.: US 10,146,819 B2
(45) Date of Patent: Dec. 4, 2018

(54) DATABASE INDEXES

(71) Applicant: International Business Machines Corporation, Armonk, NY (US)

(72) Inventors: Ge Song, Beijing (CN); Ke Wei Wei, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 14/881,211

(22) Filed: Oct. 13, 2015

(65) Prior Publication Data
US 2016/0110393 A1   Apr. 21, 2016

(30) Foreign Application Priority Data

Oct. 16, 2014 (CN) .......................... 2014 1 0546909

(51) Int. Cl.
*G06F 17/30* (2006.01)
(52) U.S. Cl.
CPC .............................. *G06F 17/30336* (2013.01)
(58) Field of Classification Search
None
See application file for complete search history.

(56) References Cited

U.S. PATENT DOCUMENTS

| | | | |
|---|---|---|---|
| 6,470,330 B1 | 10/2002 | Das et al. | |
| 7,693,813 B1 * | 4/2010 | Cao ................... | G06F 17/30616 707/999.001 |
| 7,792,823 B2 | 9/2010 | Cain et al. | |
| 7,797,347 B2 | 9/2010 | Draese et al. | |
| 7,895,191 B2 | 2/2011 | Colossi et al. | |
| 8,037,057 B2 | 10/2011 | Burger | |

(Continued)

FOREIGN PATENT DOCUMENTS

| CN | 101535990 A | 9/2009 |
|---|---|---|
| CN | 103810300 A | 5/2014 |

OTHER PUBLICATIONS

IBM Knowledge Center, "Generating and Acting on Recommendations for Indexes for Improving The Performance of Single SQL Statements", Data Studio 4.1.0, http://www-01.ibm.com/support/knowledgecenter/SS62YD_4.1.0/com.ibm.datatools.qrytune.sngqry.doc/topics/genrecsindexes.html, printed on Sep. 17, 2015, pp. 1-3.

(Continued)

*Primary Examiner* — Wilson Lee
(74) *Attorney, Agent, or Firm* — Michael A. Petrocelli

(57) ABSTRACT

A method and system for database indexing, wherein a database index comprises at least one index include. The method and system includes obtaining the number of executions of each of a plurality of Structured Query Language (SQL) statements within a certain time period, respectively, wherein the plurality of SQL statements use the database index. For each of the at least one index include, calculating a number of hits of the index include according to the number of executions of each of the plurality of SQL statements. Further, obtaining a length of the index include, and calculating a hit frequency of the index include by using the number of hits and the length of the index include. The hit frequency equals the number of hits divided by the length.

10 Claims, 4 Drawing Sheets

(56) References Cited

U.S. PATENT DOCUMENTS

| | | | |
|---|---|---|---|
| 8,166,045 B1 * | 4/2012 | Mazumdar | G06F 17/30616 707/713 |
| 8,458,167 B2 | 6/2013 | Lohman et al. | |
| 2005/0187917 A1 | 8/2005 | Lawande et al. | |
| 2006/0287993 A1 * | 12/2006 | Yao | G06F 17/3053 |
| 2010/0125594 A1 * | 5/2010 | Li | G06F 17/30985 707/758 |

OTHER PUBLICATIONS

Microsoft, "Index with Included Columns", SQL Server 2008 R2, https://technet.microsoft.com/en-in/library/ms190806%28v=sql.105%29.aspx, printed on Jun. 26, 2015, pp. 1-3.

Chinese Application No. 201410546909.7, filed Oct. 16, 2014, entitled: "Method and System for Database Index", pp. 1-20.

Liu et al., Abstract for "Database Indexing and Optimization", China Academic Journal Electronic Publishing House, Jun. 2012, pp. 24-26.

Yu et al., Abstract for "Study on Database Index", China Academic Journal Electronic Publishing House, Feb. 2010, No. 2, pp. 84-91.

\* cited by examiner

| AccNo 4 bytes | AccTp 1 byte | Name 10bytes | Gender 1 byte | Address 100 bytes | RID |
|---|---|---|---|---|---|
| 101 | N | Kim | F | 555 Bailey Ave, San Jose, CA | RID1 |
| 102 | V | Kim | F | 555 Bailey Ave, San Jose, CA | RID2 |
| 103 | N | Leo | M | 388, Atlantic Ave, Brooklyn, NYC, NY | RID3 |
| 104 | N | Kate | F | 566 Lexington Ave, Manhattan, NYC, NY | RID4 |
| 105 | N | John | M | 555 Bailey Ave, San Jose, CA | RID5 |
| 106 | N | Jim | M | 37 Williamsburg, Brooklyn, NYC, NY | RID6 |
| ... | ... | ... | ... | ... | ... |

FIG. 4

DATABASE INDEXES

BACKGROUND

The present invention relates to databases, and more particularly, to a method and system for database indexes.

In order to improve performance of a database query, an index include can be introduced into a database index. Normally, the index include that needs to be introduced into the database index is designated by a database administrator. The database administrator may not know actual condition of subsequent database operations. For example, the index include that needs to be introduced into the database index can be designated by a database administrator, and may not achieve the administrator's original intention, or even worse, it instead leads to decrease in performance of the database query.

SUMMARY

In view of the above problem in the art, the present invention sets forth a method and system for database indexing, such that the introduced index include can significantly improve query performance of a database.

In an aspect of the present invention, a method for database indexing, wherein a database index comprises at least one index include. The method includes obtaining the number of executions of each of a plurality of Structured Query Language (SQL) statements within a certain time period, respectively, wherein the plurality of SQL statements use the database index. For each of the at least one index include, calculating a number of hits of the index include according to the number of executions of each of the plurality of SQL statements. Further, obtaining a length of the index include, and calculating a hit frequency of the index include by using the number of hits and the length of the index include. The hit frequency equals the number of hits divided by the length.

In another aspect according to the present invention, a system for database indexing includes a database index which comprises at least one index include. The system comprising: a computer system comprising one or more computer processors, one or more computer-readable storage media, and program instructions stored on one or more of the computer-readable storage media for execution by at least one of the one or more processors. The computer system comprising: an obtaining unit configured to obtain a number of executions. The number of executions of each of a plurality of Structured Query Language (SQL) statements within a certain time period, respectively, wherein the plurality of SQL statements use the database index. A hit frequency calculating unit configured to, for the at least one index: calculate a number of hits of the index include according to the number of executions of each of the plurality of SQL statements; obtain a length of the index include; calculate a hit frequency of the index include by using the number of hits and the length of the index include, wherein: the hit frequency equals the number of hits divided by the length.

In another aspect according to the present invention, a computer program product for database indexing includes a database index including at least one index include. The computer program product comprising a computer readable storage medium having program instructions embodied therewith, wherein the computer readable storage medium is not a transitory signal per se. The program instructions executable by a computer to cause the computer to perform a method, comprising: obtaining the number of executions of each of a plurality of Structured Query Language (SQL) statements within a certain time period, respectively, wherein the plurality of SQL statements use the database index. For each of the at least one index include: calculating a number of hits of the index include according to the number of executions of each of the plurality of SQL statements; obtaining a length of the index include; calculating a hit frequency of the index include by using the number of hits and the length of the index include, wherein: the hit frequency equals the number of hits divided by the length.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 shows a diagram of a database index including index include.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
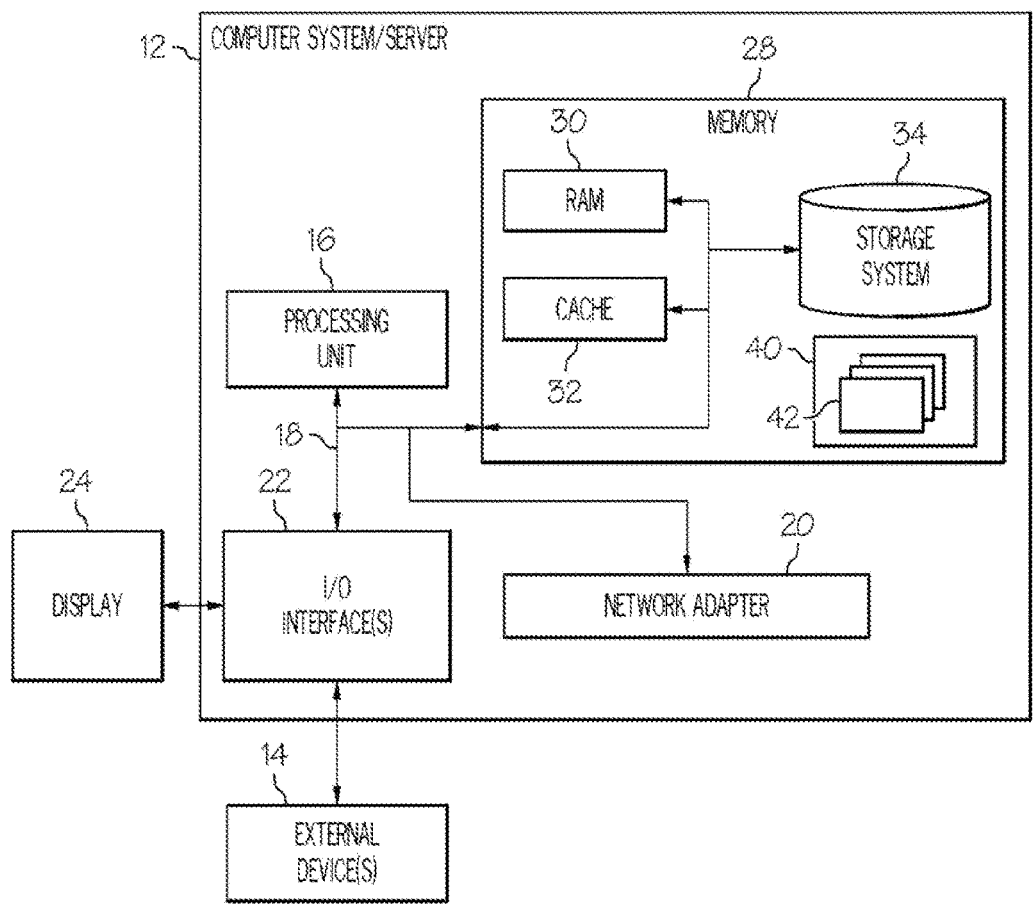
FIG. 1 shows a block diagram of an exemplary computer system/server 12 which is applicable to implement the embodiments of the present invention.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In addition to conventional computer system/server 12 shown in FIG. 1, mobile electric device may also be included for achieving embodiments of the invention, including but not limited to, mobile telephone, PDA, tablet computer and others. Typically, mobile electric device has input device, including but not limited to, touch input device, such as, touch screen, touch panel and others.

Figure 2:
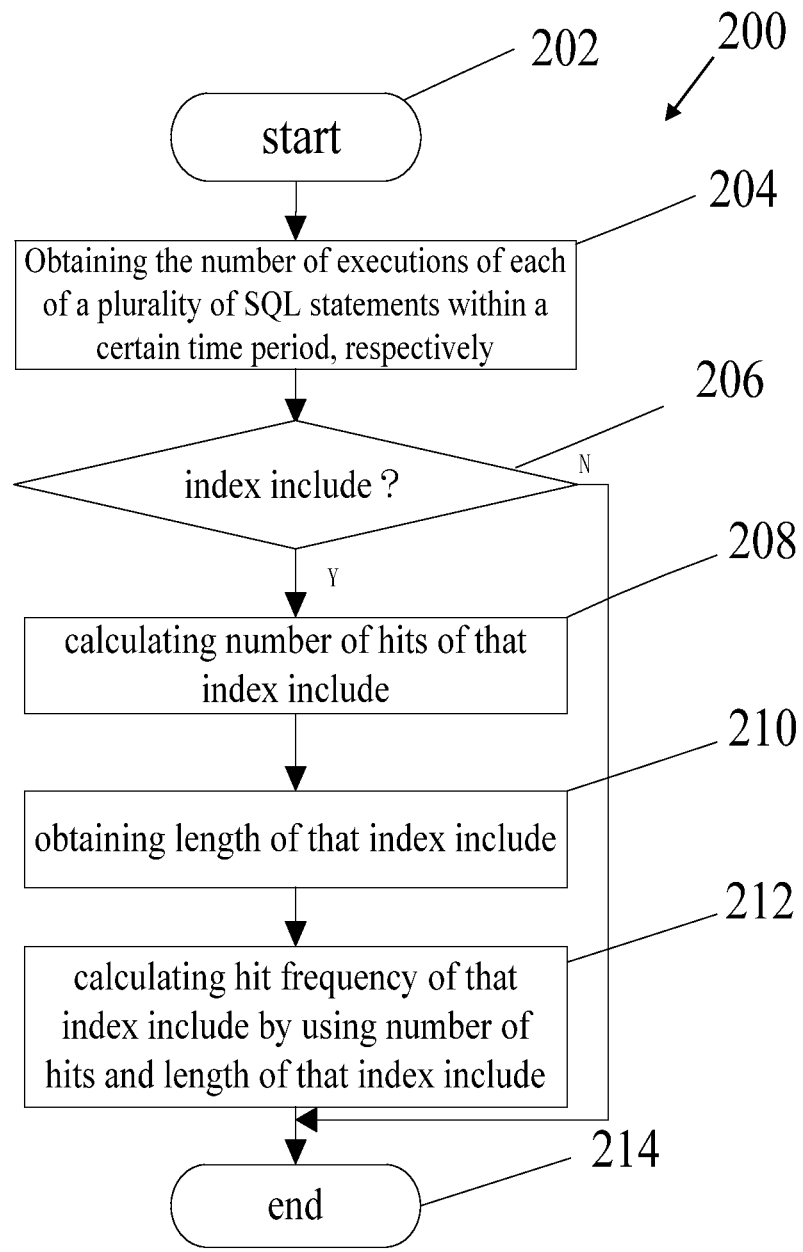
FIG. 2 shows a flowchart of a method for database index according to an embodiment of the present invention.

Now with reference to FIG. 2, a flowchart of a method 200 for database index according to an embodiment of the present invention is shown. According to an embodiment of the present invention, the database index comprises at least one index include. The method 200 starts from step 202.

Next, the method 200 proceeds to step 204: obtaining the number of executions of each of a plurality of Structured Query Language (SQL) statements within a certain time period, respectively, wherein the plurality of SQL statements use the database index.

Next, the method 200 proceeds to step 206: performing steps 208 to 210 for each of the at least one index include, wherein:

At step 208, calculating the number of hits of that index include according to the number of executions of each of the plurality of SQL statements;

At step 210, obtaining length of that index include;

At step 212, calculating hit frequency of that index include by using the number of hits and the length of that index include, wherein:

hit frequency=number of hits/length.

Next, after calculation of the hit frequency of each of the at least one index include is completed, the method 200 proceeds to step 214 and ends.

According to an embodiment of the present invention, the method 200 further comprising: reserving the index include according to a predetermined criterion.

According to an embodiment of the present invention, wherein the step of reserving the index include according to a predetermined criterion comprises: reserving the index include whose hit frequency is greater than a predetermined threshold.

According to an embodiment of the present invention, wherein the step of reserving the index include according to a predetermined criterion comprises: arranging the at least one index include in descending order according to the hit frequency, and reserving a predetermined number of index include with higher hit frequency.

According to an embodiment of the present invention, wherein the step of reserving the index include according to a predetermined criterion comprises: arranging the at least one index include in ascending order according to the hit frequency, and reserving a predetermined number of index include with higher hit frequency.

According to an embodiment of the present invention, the method 200 further comprising: performing index re-org by using the reserved index include.

The method 200 according to an embodiment of the present invention will be described below in detail in conjunction with the database index shown in FIG. 4. Referring to FIG. 4, an example of a database index 400 including at least one index include according to an embodiment of the present invention is shown. As shown in FIG. 4, in addition to key column AccNo 402 (account number) and AccTp 404 (account type), the database index 400 further comprises index include Name 406, Gender 408 and Address 410, and RID 412 (row ID). The database index 400 shown in FIG. 4 further shows length of each column, in which length of key column AccNo and AccTp are 4 bytes and 1 byte, respectively, and length of the index include Name, gender and Address are 10 bytes, 1 byte and 100 bytes, respectively.

It should be appreciated that, the database index 400 shown in FIG. 4 is merely an example of a database index comprising at least one index include. According to the present invention, a database index may comprise only one index include, or may comprise less or more index include.

Assume the following plurality of SQL statements using database index have been executed on a database corresponding to the database index 400 shown in FIG. 4 within a certain time period:

SELECT AccNo, AccTp FROM ACCOUNT WHERE AccNo=124

SELECT AccNo, AccTp FROM ACCOUNT WHERE AccNo=102 AND AccTp='V'

SELECT AccNo, Name, Gender FROM ACCOUNT WHERE AccNo=?

SELECT AccNo, AccTp, Name, Address FROM ACCOUNT WHERE AccNo=:hv

SELECT AccNo, AccTp, Name, Gender, Address FROM ACCOUNT WHERE AccNo=102 and AccTp='V'

According to an embodiment of the present invention, first, the number of executions of each of a plurality of SQL statements using the database index within the certain time period is obtained respectively, to get statistical result of the number of executions of each of the plurality of SQL statements as shown in Table 1.

TABLE 1

Number of executions of a plurality of SQL statements within a certain time period

| SQL statement involved | Number of executions |
|---|---|
| SELECT AccNo, AccTp FROM ACCOUNT WHERE AccNo=124 | 1243 |
| SELECT AccNo, AccTp FROM ACCOUNT WHERE AccNo=102 AND AccTp='V' | 2034 |
| SELECT AccNo, Name, Gender FROM ACCOUNT WHERE AccNo=? | 411 |
| SELECT AccNo, AccTp, Name, Address FROM ACCOUNT WHERE AccNo=:hv | 2324 |
| SELECT AccNo, AccTp, Name, Gender, Address FROM ACCOUNT WHERE AccNo=102 and AccTp='V' | 657 |

Next, for each index include Name, Gender and Address:

calculate the number of hits of the index include according to the number of executions of each of the plurality of SQL statements; obtain length of the index include; calculate hit frequency of the index include by using the number of hits and the length of the index include, wherein:

hit frequency=number of hits/length.

For index include Name:

its the number of hits is: 411+2324+657=3392, its length is 10 bytes, thus the hit frequency of the index include is 339;

For index include Gender:

its number of hits is 411+657=1068, its length is 1 byte, thus the hit frequency of the index include is 1068;

For index include Address:

its number of hits is 2324+657=2981, its length is 100 bytes, thus the hit frequency of the index include is 30.

Statistical result of hit frequency of the index include obtained after performing the above calculation on each index include is shown in Table 2.

TABLE 2

Hit Frequency of a plurality of index include within a certain time period

| Index include | Number of hits | Length (byte) | Hit frequency |
|---|---|---|---|
| Name | 3392 | 10 | 339 |
| Gender | 1068 | 1 | 1068 |
| Address | 2981 | 100 | 30 |

Since storage space of database index is limited, by calculating hit frequency of each index include, it can be determined which data columns are to be introduced into the database index as index include according to the hit frequency of the index include, thus the introduced index include can significantly improve query performance of the database, and effectively solve the problem brought by the practice in prior art in which introduced index include are designated by a database administrator, thus being capable of optimizing database index.

According to an embodiment of the present invention, the index include is reserved according to a predetermined criterion.

According to an embodiment of the present invention, reserving the index include according to a predetermined criterion comprises: reserving the index include whose hit frequency is greater than a predetermined threshold. Suppose the threshold of the hit frequency predetermined by the system is 200, then index include Name and Gender are reserved. Suppose the threshold of the hit frequency predetermined by the system is 500, then index include Gender is reserved.

According to an embodiment of the present invention, reserving the index include according to a predetermined criterion comprises: arranging at least one index include in descending order according to the hit frequency, to get {Gender, Name, Address}, and reserving a predetermined number of index include with higher hit frequency. Suppose the predetermined number is 2, then index include Gender and Name are reserved. Suppose the predetermined number is 1, then index include Gender is reserved.

According to an embodiment of the present invention, reserving the index include according to a predetermined criterion comprises: arranging at least one index include in ascending order according to the hit frequency, to get {Address, Name, Gender}, reserving a predetermined number of index include with higher hit frequency. Suppose the predetermined number is 2, then index include Gender and Name are reserved. Suppose the predetermined number is 1, then index include Gender is reserved.

According to an embodiment of the present invention, index re-org is performed by using the reserved index include. The technical detail of index re-org belongs to prior art, which will not be described here in detail. By index re-org, only those index include satisfying a predetermined criterion are reserved in the database index.

Figure 3:
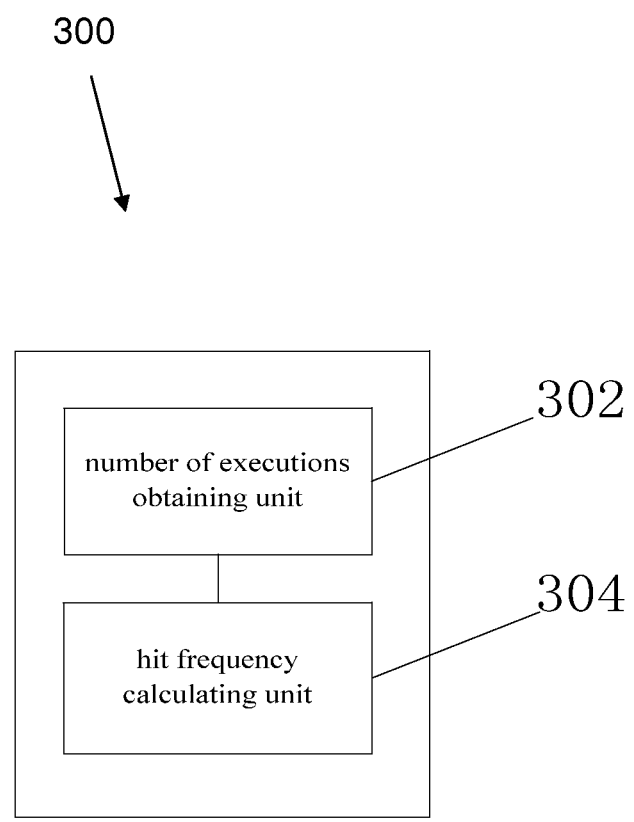
FIG. 3 shows a block diagram of a system for database index according to an embodiment of the present invention.

Now referring to FIG. 3, a block diagram of a system 300 for database index according to an embodiment of the present invention is shown. According to an embodiment of the present invention, the database index comprises at least one index include. The system 300 comprising:

a number of executions obtaining unit 302 configured to obtain number of executions of each of a plurality of Structured Query Language (SQL) statements within a certain time period, respectively, wherein the plurality of SQL statements use the database index;

a hit frequency calculating unit 304 configured to, for each of the at least one index include:

calculate number of hits of that index include according to the number of executions of each of the plurality of SQL statements; obtain length of that index include; calculate hit frequency of that index include by using the number of hits and the length of that index include, wherein:

hit frequency=number of hits/length.

According to an embodiment of the present invention, the system 300 further comprising: a reserving unit (not shown) configured to reserve the index include according to a predetermined criterion.

According to an embodiment of the present invention, the reserving unit is further configured to: reserve the index include whose hit frequency is greater than a predetermined threshold.

According to an embodiment of the present invention, the reserving unit is further configured to: arrange the at least one index include in descending order according to the hit frequency; and reserve a predetermined number of index include with higher hit frequency.

According to an embodiment of the present invention, the reserving unit is further configured to: arrange the at least one index include in ascending order according to the hit frequency; and reserve a predetermined number of index include with higher hit frequency.

According to an embodiment of the present invention, the system 300 further comprising: a re-org unit (not shown) configured to perform index re-org by using the reserved index include.

Thus, the present invention relates to a method and system for database index. Specially, a method for database index is disclosed, the database index comprises at least one index include, the method comprising: obtaining number of executions of each of a plurality of Structured Query Language (SQL) statements within a certain time period, respectively, wherein the plurality of SQL statements use the database index; for each of the at least one index include: calculating number of hits of that index include according to the number of executions of each of the plurality of SQL statements; obtaining length of that index include; calculating hit frequency of that index include by using the number of hits and the length of that index include, wherein: hit frequency=number of hits/length. With the method and system of illustrative embodiments, by calculating hit frequency of each index include, the introduced index include can significantly improve query performance of the database, thereby optimizing database index.

Thereby, according to an illustrative embodiment of the present invention, there is provided a method for database index, the database index comprises at least one index include, the method comprising: obtaining the number of executions of each of a plurality of Structured Query Language (SQL) statements within a certain time period, respectively, wherein the plurality of SQL statements use the database index; for each of the at least one index include: calculating the number of hits of that index include according to the number of executions of each of the plurality of SQL statements; obtaining length of that index include; calculating hit frequency of that index include by using the number of hits and the length of that index include, wherein: hit frequency=number of hits/length.

According to another illustrative embodiment of the present invention, there is provided a system for database index, the database index comprises at least one index include, the system comprising: a number of executions obtaining unit configured to obtain number of executions of each of a plurality of Structured Query Language (SQL) statements within a certain time period, respectively, wherein the plurality of SQL statements use the database index; a hit frequency calculating unit configured to, for each of the at least one index include: calculate the number of hits of that index include according to the number of executions of each of the plurality of SQL statements; obtain length of that index include; calculate hit frequency of that index include by using the number of hits and the length of that index include, wherein: hit frequency=number of hits/length.

With the method and system of the illustrative embodiments, by calculating hit frequency of each index include, the introduced index include can significantly improve query performance of the database, thereby optimizing the database index or the database indexing.

A method and system for database index according to embodiments of the present invention have been described above in conjunction with accompanying drawings. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for database indexing of a database, a database index comprises at least one index include, the method comprising:
    obtaining the number of executions of each of a plurality of Structured Query Language (SQL) statements within a certain time period for the database, respectively, wherein the plurality of SQL statements use the database index;
    for each of the at least one index include:
        calculating a number of hits of the index include according to the number of executions of each of the plurality of SQL statements;
        obtaining a length of the index include;
        calculating a hit frequency of the index include by using the number of hits and the length of the index include, wherein:
            the hit frequency equals the number of hits divided by the length;
    reserving the index include according to a predetermined criterion, and wherein the reserving the index include according to the predetermined criterion comprises reserving the index include whose hit frequency is greater than a predetermined threshold;
    introducing into the database index, the reserved index include whose hit frequency is greater than the predetermined threshold; and
    performing an index re-org by using the reserved index include such that the reserve index include whose hit frequency is greater than the predetermined threshold is being introduced in the database index, resulting in improved query performance of the database index for optimizing database indexing, and thereby not requiring designation of index includes by a database administrator.

2. The method according to claim 1, wherein the reserving the index include according to a predetermined criterion comprises:
    arranging the at least one index include in a descending order according to the hit frequency; and
    reserving a predetermined number of index includes with a higher hit frequency.

3. The method according to claim 1, wherein the reserving the index include according to a predetermined criterion comprises:
    arranging the at least one index include in an ascending order according to the hit frequency; and reserving a predetermined number of index includes with higher hit frequency.

4. A system for database indexing of a database, a database index comprises at least one index include, the system comprising:
   a computer system comprising one or more computer processors, one or more computer-readable storage media, and program instructions stored on one or more of the computer-readable storage media for execution by at least one of the one or more processors, the computer system comprising:
      an obtaining unit configured to obtain a number of executions, the number of executions of each of a plurality of Structured Query Language (SQL) statements within a certain time period for the database, respectively, wherein the plurality of SQL statements use the database index;
      a hit frequency calculating unit configured to, for the at least one index:
      calculate a number of hits of the index include according to the number of executions of each of the plurality of SQL statements;
      obtain a length of the index include;
      calculate a hit frequency of the index include by using the number of hits and the length of the index include, wherein:
      the hit frequency equals the number of hits divided by the length;
      reserving the index include, using a reserving unit configured to reserve the index include, according to a predetermined criterion, and wherein the reserving unit is further configured to reserve the index include according to the predetermined criterion comprises reserving the index include whose hit frequency is greater than a predetermined threshold;
      introducing into the database index, the reserved index include whose hit frequency is greater than the predetermined threshold; and
      performing an index re-org, using a re-org unit configured to perform the index re-org, by using the reserved index include such that the reserve index include whose hit frequency is greater than the predetermined threshold is being introduced in the database index, resulting in improved query performance of the database index for optimizing database indexing, and thereby not requiring designation of index includes by a database administrator.

5. The system according to claim 4, wherein the reserving unit is further configured to:
   arrange the at least one index include in a descending order according to the hit frequency; and
   reserve a predetermined number of index includes with a higher hit frequency.

6. The system according to claim 4, wherein the reserving unit is further configured to:
   arrange the at least one index include in an ascending order according to the hit frequency; and
   reserve a predetermined number of index includes with a higher hit frequency.

7. A computer program product for database indexing of a database, a database index including at least one index include, the computer program product comprising a computer readable storage medium having program instructions embodied therewith, wherein the computer readable storage medium is not a transitory signal per se, the program instructions executable by a computer to cause the computer to perform a method, comprising:
   obtaining the number of executions of each of a plurality of Structured Query Language (SQL) statements within a certain time period for the database, respectively, wherein the plurality of SQL statements use the database index;
   for each of the at least one index include:
      calculating a number of hits of the index include according to the number of executions of each of the plurality of SQL statements;
      obtaining a length of the index include;
      calculating a hit frequency of the index include by using the number of hits and the length of the index include, wherein:
      the hit frequency equals the number of hits divided by the length;
   reserving the index include according to a predetermined criterion, and wherein the reserving the index include according to the predetermined criterion comprises reserving the index include whose hit frequency is greater than a predetermined threshold;
   introducing into the database index, the reserved index include whose hit frequency is greater than the predetermined threshold; and
   performing an index re-org by using the reserved index include such that the reserve index include whose hit frequency is greater than the predetermined threshold is being introduced in the database index, resulting in improved query performance of the database index for optimizing database indexing, and thereby not requiring designation of index includes by a database administrator.

8. The computer program product according to claim 7, wherein the reserving the index include according to a predetermined criterion comprises:
   arranging the at least one index include in a descending order according to the hit frequency; and
   reserving a predetermined number of index includes with a higher hit frequency.

9. The computer program product according to claim 7, wherein the reserving the index include according to a predetermined criterion comprises:
   arranging the at least one index include in an ascending order according to the hit frequency; and
   reserving a predetermined number of index includes with higher hit frequency.

10. The method of claim 1, wherein performing the index re-org by using the reserved index include is such that the reserve index include whose hit frequency is greater than the predetermined threshold is only being introduced in the database index, resulting in improved query performance of the database index for optimizing database indexing.

* * * * *